Patented Mar. 29, 1932

1,851,487

UNITED STATES PATENT OFFICE

JOSEPH BLUMENFELD, OF PARIS, FRANCE, ASSIGNOR, BY MESNE ASSIGNMENTS, TO KREBS PIGMENT AND COLOR CORPORATION, OF NEWARK, NEW JERSEY, A CORPORATION OF DELAWARE

PREPARATION OF TITANIUM HYDROXIDE

No Drawing. Original application filed February 2, 1928, Serial No. 251,253, now Patent No. 1,795,467, dated March 10, 1931. Divided and this application filed May 15, 1930. Serial No. 452,812.

This invention relates to a process for preparing titanium hydroxide or oxide by the hydrolysis at elevated temperatures of sulphuric acid solutions containing titanium.

These solutions are obtained, for instance, by the action of sulphuric acid on titanium-bearing ores such as ilmenite, rutile, or the like. The preparation of such solutions is a well-known step in the art and has been described by me in Patent 1,504,669. Solutions of this character usually contain iron and may also contain various other impurities.

By proper chemical treatment the sulphuric acid solutions of titanium may be caused to undergo hydrolysis, with the resultant formation of a precipitate of free titanium hydroxide or oxide and an attendant increase in the free acidity of the solution. It should be noted, also, that the facts concerning the relation between titanium hydroxide and titanium dioxide are not completely known at the present time. When titanium solutions are treated chemically in a manner that should ordinarily produce a metallic hydroxide, the resultant product apparently undergoes a transition during drying and when fully dry is found to be titanium dioxide ($TiO_2$). Hereafter, in the present specification and claims, the hydrolysis product is referred to as titanium dioxide.

In existing hydrolysis processes the solutions of titanium oxide are brought to a previously determined acid concentration and are then subjected to heating in various ways, such as boiling at atmospheric pressure or in autoclaves under elevated pressure, or in vacuo in some instances; the volume being maintained constant by refluxing or by adding fresh water. In all cases the solutions subjected to hydrolysis are true solutions and possess the homogeneity which characterizes crystalloid solutions.

There is a wide variance in the physical and chemical properties of titanium dioxide produced by hydrolysis, dependent upon the exact conditions under which the hydrolysis takes place. The object of the present invention is to provide an improved hydrolysis process, whereby titanium dioxide of consistently uniform properties may be produced rapidly and in good yield. Another object of the invention is to achieve this favorable result in a solution of relatively high concentration, so that the sulphuric acid present and formed during the process may be recovered and concentrated economically. Other objects of the invention will become apparent.

The invention consists in preparing titanium oxide or hydroxide by hydrolytic precipitation, characterized by effecting the hydrolysis in a solution of titanium oxide in which a pronounced heterogeneity is created due to the presence therein of colloidal particles.

The presence of iron in the solution to be hydrolyzed does not interfere with the reaction, but if much is present in solution it should be reduced, which may be accomplished by a simple crystallization of ferrous sulphate, or by an improved process of refrigeration as described in my Patent No. 1,707,248.

In order that the present invention may be appreciated, reference is made to an example showing a method of hydrolyzing in the ordinary way.

A solution of titanium containing about 200 grams per liter of $TiO_2$ and 500 grams per litter of $H_2SO_4$ free or combined with titanium is diluted cold to a concentration of 400 grams per liter of $H_2SO_4$ and 160 grams per liter of $TiO_2$. This diluted solution is then heated to and maintained at a temperature of about 100° C. and gives by hydrolysis the very low yield of precipitated $TiO_2$ of about 30%, the time taken to obtain this yield being about 24 hours.

I have now discovered that the speed of hydrolysis and quantitative yield of products may be increased and the quality of the precipitated $TiO_2$ may be improved if the hydrolysis of the titanium sulphate solution is carried out in the presence of $TiO_2$ in colloidal form. For example, if colloidal $TiO_2$ is added to the solution to be hydrolyzed, which may be prepared as previously described, and exactly the same method of hydrolysis is adopted, a yield of about 95% $TiO_2$ is obtained in about three hours.

To achieve these favorable results one may either add separately prepared colloidal titanium dioxide to the solution prior to hydrolysis, or one may conduct the hydrolysis itself in such a manner that an adequate quantity of colloidal $TiO_2$ is produced in the solution prior to any actual precipitation if $TiO_2$. This application is a division of my application Serial No. 251,253, filed February 2, 1928, now Patent No. 1,795,467, dated March 10, 1931, and a continuation of my application Serial No. 128,324, filed August 9, 1926, and relates particularly to the first of these two methods for accomplishing this improved result.

As a specific example of my improved process, a solution rich in colloidal $TiO_2$ may be produced in any suitable manner, for example by following the first portion of the procedure described as Example II in my copending application Serial No. 251,253, now Patent No. 1,795,467, dated March 10, 1931. This procedure comprises adding a quantity of titanium solution, containing about 200 grams per liter of $TiO_2$ and 500 grams per liter of $H_2SO_4$, (free and combined with titanium) to a greater quantity of boiling water. The solution is added at a uniform rate over a period equivalent to about 4 to 6 minutes per volume of solution added to a volume of water and the mixture is stirred during the addition.

As the two solutions are mixed, colloidal $TiO_2$ will be formed and the concentration of the colloidal $TiO_2$ will continue to increase after the mixing is completed. After a short time, however, $TiO_2$ will commence to precipitate out of the solution and the concentration of colloidal $TiO_2$ will thereafter decrease.

The solution rich in colloidal $TiO_2$, produced as described above and before any substantial precipitation of $TiO_2$, may be mixed with a titanium solution containing about 200 grams of $TiO_2$ per liter and 500 grams of $H_2SO_4$ per liter in such proportions that the mixed solutions will have an $H_2SO_4$ concentration (free and combined with titanium) of about 400 grams per liter. These mixed solutions may be heated to about the boiling temperature for approximately three hours to complete the hydrolysis.

If preferred the collodial suspension of $TiO_2$ may be produced in a more concentrated titanium sulphate solution by using a smaller quantity of water. In this event the solution to be hydrolyzed should be diluted in order that the resultant mixture may have the desired $H_2SO_4$ concentration. For example, if the solution containing the colloidal $TiO_2$ has an acid concentration of about 400 grams per liter, it may be added to a solution to be hydrolyzed which contains about 400 grams per liter of $H_2SO_4$ and 160 grams per liter of $TiO_2$.

If the solution of colloidal $TiO_2$ is to be kept for some time, it may be stabilized by being cooled when it has reached the maximum concentration of colloidal particles and before any active precipitation has taken place. In this manner large quantities of the colloidal $TiO_2$ solutions may be prepared and may be stabilized and stored for use as needed.

The solution containing the colloidal $TiO_2$ produced as described above will pass through a filter and the concentration of colloidal $TiO_2$ in the solutions may be determined by filtering the solution, coagulating the colloidal $TiO_2$ in the filtrate and filtering out and weighing the coagulated $TiO_2$. The coagulation of the colloidal $TiO_2$ may be accomplished by adding concentrated hydrochloric acid to the solution and boiling.

The titanium dioxide produced by my hydrolysis process is removed from the mixture by decantation and/or by filtering, after which it may be washed to remove acid and iron, and is dried. The dry $TiO_2$ may be treated in various ways depending upon how it is to be used. For the preparation of pigment, it may be calcined in the manner usually employed in preparing pigments. The resultant product is a tough granular material which may be converted into an excellent white pigment by grinding.

I have found that it is the presence of colloidal $TiO_2$ in the mixture that causes the improved yield and rate of hydrolysis, but the exact manner in which the colloidal phase promotes the precipitation is not known. The concentration of the colloidal $TiO_2$ in the solution to be hydrolyzed may be varied between wide limits, for example, a great improvement in the results may be had with a concentration of colloidal $TiO_2$ as low as 1½ or 2 grams per liter and concentrations up to and considerably above 30 grams per liter may be used.

Both the final yield of $TiO_2$ from hydrolysis and the quality of the material for pigment purposes, after calcining, is affected by the final acidity of the solution hydrolyzed. In turn, the final acidity is, of course, an expression of the concentration at which the hydrolysis is effected. The proportions of acid to $TiO_2$ given in the examples have been used because they represent the solutions ordinarily obtained in the treatment of titanium-bearing ores (ilmenite), but hydrolysis can be performed with equal satisfaction in solutions having a greater or less free acidity factor than those given in the examples.

Much more important than the free acidity factor is the total or final acidity of the hydrolyzed solution expressed as sulphuric acid. This acidity will be equal to the free acid originally present prior to hydrolysis, plus the acid liberated during the hydrolysis as the result of the precipitation of $TiO_2$. This final acidity should be in the neighborhood of 400 grams per liter, since the best recovery of the TiO₂ is obtained at this concentration, although the process is operable at lower concentrations. On the contrary, it is not advisable to operate the process at acid concentrations much above 400 grams per liter because of the tendency of the TiO₂ to re-dissolve in the acid present. If the acid is too concentrated, the yields are low, while if it is too dilute, the process is uneconomic and gives a poor product.

The final acidity of the hydrolysis mixture is, of course, independent of the precise quantities of titanium solution and water mixed, and the desired final concentration may be had by mixing different quantities of solutions of the concentration available, the final concentration depending upon the ratio of the strong solution, weak solution and water.

Titanium solutions originally containing considerably less than 600 grams per liter of sulphuric acid may be hydrolyzed in accordance with my process. In general, more dilute solutions are more easily hydrolyzed and at lower temperatures. On adding a small quantity of such solutions to hot water, colloidal TiO₂ is formed in the same manner, and by the same procedure of continuing the addition gradually over a period of several minutes the production of colloidal particles of TiO₂ prior to actual precipitation, is effected.

While I prefer to use ordinary hot water in the production of the colloidal suspension of titanium oxide, I may, alternatively, employ dilute solutions containing titanium in place of water. Such solutions of lesser concentration of titanium are obtained, for example, as wash water from other process steps and by re-use in the manner described the loss of titanium in the plant may be avoided. Satisfactory results may also be obtained with water or dilute solution which are not heated to the boiling temperature as described in the example.

The process can be applied not only to the hydrolysis of titanium solutions but to other hydrolyzable solutions such as those of zirconium, thorium, tin, cerium, etc., and further these methods are equally valid when the precipitation is effected in the presence of other substances adapted to serve, for example, as constituents of paint pigments, etc. (such as BaSO₄, CaSO₄, SiO₂ and the like) with which it is desired to mix the main precipitate very intimately. These substances may either be prepared in the same apparatus in which the hydrolysis takes place, or separately.

It is apparent that many modifications of my invention may be utilized and it is not intended to limit the invention to the particular illustrations given.

What I claim is:

1. In the preparation of titanium oxide, or hydroxide, the steps comprising mixing a separately prepared colloidal solution of titanium dioxide with a solution containing titanium sulphate and heating the mixed solutions to complete the precipitation.

2. In the preparation of titanium oxide, or hydroxide, the steps comprising mixing a separately prepared solution containing colloidal titanium oxide or hydroxide with a solution containing titanium and sulphate ions, and heating the mixed solutions.

3. In the preparation of titanium oxide, or hydroxide, the steps comprising mixing a separately prepared diluent and colloidal titanium oxide or hydroxide with a solution containing titanium and sulphate ions, and heating during the precipitation.

4. In the preparation of titanium oxide, or hydroxide, the steps comprising mixing a separately prepared solution containing colloidal titanium dioxide or hydroxide with a crystalloid solution containing titanium and sulphate ions, and heating during the precipitation.

5. In the preparation of titanium dioxide, the steps comprising mixing a separately prepared solution containing colloidal titanium dioxide with a solution containing titanium sulphate and heating the mixed solutions to substantially the boiling temperature.

6. In the preparation of titanium dioxide, the steps comprising mixing a separately prepared solution containing colloidal titanium oxide or hydroxide with a titanium sulphate solution in such proportions that the resultant solution will have a concentration of sulphuric acid, free and combined with titanium, of about 400 grams per liter, and heating the mixed solutions.

7. In the preparation of titanium dioxide, the steps comprising mixing a separately prepared solution containing colloidal titanium oxide or hydroxide with a titanium sulphate solution in the presence of a substance adapted to serve as a constituent of a paint pigment and heating the mixed solutions.

8. In the preparation of an oxide of one of the elements of the titanium-thorium group, the steps comprising mixing a separately prepared solution containing a colloidal suspension of the oxide of the element with a solution containing a sulphate of the element, and heating the mixed solutions.

9. In the preparation of a stable solution containing colloidal titanium dioxide, the steps comprising adding a concentrated solution of titanium sulphate to hot water and cooling the mixed solution before any substantial precipitation of titanium dioxide takes place.

10. A stable solution containing colloidal titanium dioxide in the presence of titanium and sulphate ions.

11. A solution containing colloidal titanium dioxide capable of being coagulated by boiling with hydrochloric acid.

12. In the preparation of an oxide of one of the elements of the group comprising titanium, zirconium, thorium, tin and cerium, the steps comprising mixing a separately prepared solution containing a colloidal suspension of an oxide of the element with a solution containing a sulphate of the element, and heating the mixed solutions.

13. In the preparation of titanium oxide or hydroxide, the steps comprising adding a concentrated solution of titanium sulphate to hot water and cooling the mixed solution before any substantial precipitation of titanium dioxide takes place, mixing the resulting colloidal solution with a solution containing titanium sulphate, and heating the mixed solution.

14. In a process of preparing a titanium oxygen compound the steps comprising mixing with agitation a solution of a hydrolyzable titanium salt with a separately prepared colloidal solution of a titanium oxygen compound and heating the mixed solution to effect precipitation.

15. In a process of preparing a titanium oxygen compound the steps comprising mixing with agitation a solution of hydrolyzable titanium salt with a separately prepared colloidal solution of a titanium oxygen compound in the presence of a substance adapted to serve as a constituent of a paint pigment.

16. A solution containing colloidal titanium dioxide capable of passing through a filter and of being coagulated by boiling with hydrochloric acid.

In testimony whereof, I have signed my name to this specification this 12th day of April, 1930.

JOSEPH BLUMENFELD.